United States Patent Office 3,708,288
Patented Jan. 2, 1973

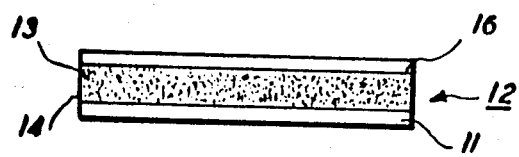
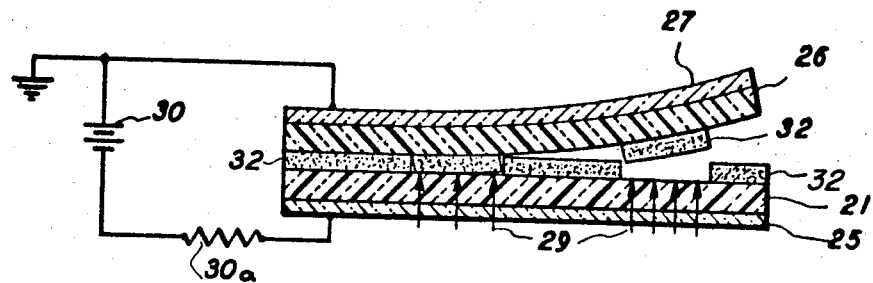
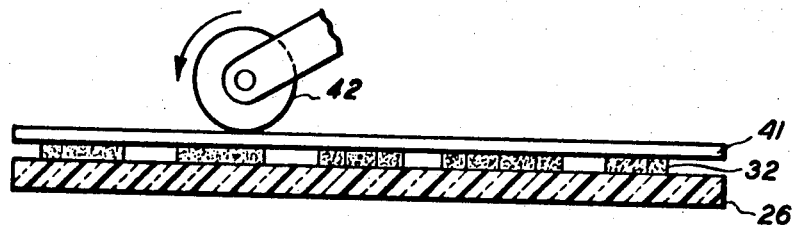
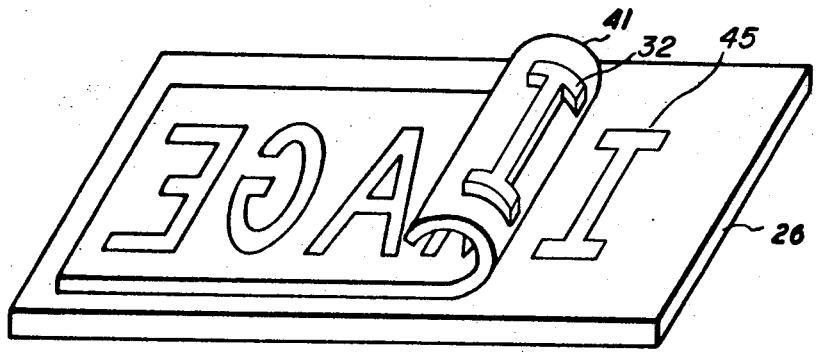

3,708,288
IMAGE TRANSFER PROCESS
Luke C. Lin, Rochester, N.Y., assignor to Xerox Corporation, Rochester, N.Y.
Filed Mar. 21, 1969, Ser. No. 809,328
Int. Cl. G03g 13/14, 13/22
U.S. Cl. 96—1.4
15 Claims

ABSTRACT OF THE DISCLOSURE

A method of transferring an image produced by means of the manifold imaging system from an image bearing medium to an image receiving medium. Manifold images are transferred to an image receiving medium by contacting the image with the receiving medium and applying external pressure to the image bearing medium and the image receiving medium.

BACKGROUND OF THE INVENTION

The present invention relates in general to imaging and more specifically to transferring an image formed by means of a manifold imaging system to an image receiving medium.

There has recently been discovered a new imaging process wherein a cohesively weak electrically photosensitive imaging layer is fractured in imagewise configuration after exposure to a pattern of electromagnetic radiation to which the layer is sensitive and an electric field while the imaging layer is sandwiched between a pair of sheets. A more comprehensive discussion of the manifold imaging process may be found in copending application Ser. No. 708,380 filed Feb. 26, 1968 in the U.S. Patent Office. Copending application Ser. No. 708,380 describes an imaging system utilizing a manifold sandwich comprising an electrically photosensitive material between a pair of sheets. In this imaging system an imaging layer is prepared by coating a layer of electrically photosensitive imaging material on a substrate. In one form the imaging layer comprises a photosensitive material such as metal-free phthalocyanine dispersed in an insulating binder. This coated substrate is called a donor. When needed, the imaging layer is rendered cohesively weak. The process step of weakening the imaging layer is termed activation and in most cases the imaging layer is activated by contacting it with a swelling agent, solvent, or partial solvent for the imaging layer or by heating. This step may be eliminated of course if the layer retains a sufficient residual solvent after having been coated on the substrate to form a solution or paste or is sufficiently cohesively weak to fracture in response to the application of light and electrical field. In general, after activation a receiver sheet is laid over the surface of the imaging layer. An electrical field is then applied across this manifold sandwich while it is exposed to a pattern of light and shadow representative of the image to be reproduced. Upon separation of the donor substrate or sheet and receiver sheet the imaging layer fractures along the lines defined by the pattern of light and shadow to which the imaging layer has been exposed. Part of the imaging layer is transferred to one of the sheets while the remainder is retained on the other sheet so that a positive image, that is, a duplicate of the original is produced on one sheet while a negative image is produced on the other.

In many instances, the apparatus employed to produce images by means of a manifold imaging process more conveniently uses donor and receiver sheets or layers which are not well suited for the end use of the image. However, transferring images from one substrate to another without loss of image quality has in the past been difficult and required expensive and complicated machinery.

SUMMARY OF THE INVENTION

It is, accordingly, an object of this invention to provide a method of transferring a manifold image from one substrate to another which overcomes the above noted disadvantages.

Another object of this invention is to provide a method of transferring a manifold image to an image receiving medium by means of convenient, economical equipment.

Another object of this invention is to provide images of improved quality which have been transferred from an image bearing substrate to an image receiving medium.

These and other objects of this invention are apparent from the following description of the invention.

In accordance with this invention there is provided a process whereby an image produced by means of a manifold imaging process is transferred to an image receiving medium. Such transfer is accomplished by contacting the image on the image bearing substrate with an image receiving medium thus forming an image transfer set. Pressure is then applied to the external surfaces of the image transfer set as by passing the set between a pair of pressure rollers. Upon separation of the image bearing medium and the image receiving medium the image adheres to the image receiving medium. The image is on the imaging receiving medium of approximately the same quality as originally produced by means of the manifold imaging process. In most cases all of the imaging material transfers from the image bearing substrate, whether the substrate is the donor or receiver sheet of the manifold sandwich, to the image receiving medium. Of course, if one is to employ the image transfer process of this invention, the optics of the manifold imaging process must be taken into account so as to provide a right reading copy upon the image receiving medium. This is normally accomplished by inserting an appropriate number of mirrors in the optical system employed to expose the image layer in the manifold imaging process. Such mirror or mirrors will provide an image which, upon transfer to the image receiving medium, will be right reading.

The image receiving medium useful in the process of this invention varies widely depending upon the end use of the image. Thus if it is desired to employ the final image as a transparency in an image projection system, the image receiving medium may be a transparent film. If it is desired to provide a hard copy then an opaque substrate may be employed. Accordingly, the substrate employed as the image receiving medium in the process of this invention varies widely depending on the end use of the transferred image. Many different substrates will occur to those skilled in the art which can be suitably employed as an image receiving medium in the process of this invention. Typical examples of image receiving media are bond paper, drafting film, vellum, leatherette, photographic film and both plastic and metal Multilith plates. Generally thermoplastic materials are preferred as image receiving media. Such materials are laminated polyethylene coated paper, polypropylene, polyethylene, polyethylene terephthalate, cellulose acetate and other high strength thermoplastic material.

As stated above, the imaging layer of the manifold imaging process contains suitable electrically photosensitive materials. Typical organic materials include: quinacridones such as: 2,9-dimethyl quinacridone, 4,11-dimethyl quinacridone, and solid solutions of quinacridones and other compositions as described in U.S. Pat. 3,160,510; carboxamides such as: N-2"-pyridyl-8,13-dioxodinaphtho-(2,1-2',3')-furan-6 - carboxamide, carboxanilides such as: 8,13-dioxodinaphtho-(2,1-2',3')-furan-6- carbox-p-methoxy-anilide, triazines such as: 2,4-diaminotriazine and 2,4 - di (1'-anthraquinonyl-amino)-6-(1'''-pyrenyl)-triazine, benzopyrrocolines such as: 2,3-phthaloyl-7,8-benzopyrrocoline, 1-cyano-2,3-phthaloyl-7 and 8-benzopyrrocoline, anthraquinones such as: 1,5-bis-(beta-phenylethyl-amino) anthraquinone, 1,5-bis-(3'-methoxy-propylamino) anthraquinone and 1,5-bis (benzylamino) anthraquinone, azo compounds such as: 2,4,6-tris (N-ethyl-N-hydroxy-ethyl-p-aminophenylazo) phloroglucinol, 1,3,5,6-tetrahydroxy-2,4,6,8 - tetra (N-methyl-N-hydroxyethyl-p-amino phenylazo) naphthalene and 1,3,5-trihydroxy - 2,4,6-tris (3'-nitro-N-methyl-N-hydroxymethyl-4'-aminophenylazo) benzene, salts and lakes of compounds derived from 9-phenylxanthene, such as: phosphotongstomolybdic lake of 3,6-bis(ethylamino)-9,2'-carboxyphenyl xanthenonium chloride; dioxanes such as: 2,9-dibenzoyl-6; lakes of fluorescein dyes, such as: lead lake of 2,7-dinitro-4,5-dibromo fluorescein; bisazo compositions such as: N,N'' - di[1' - (1 - naphthylazo)-2-hydroxy-8-naphthyl] adipdiamide, pyrenes such as: 1,3,6,8-tetraaminopyrene, metal salts and lakes of azo dyes, such as: calcium lake of 6-bromo-1 (1'-sulfo-2-naphthylazo)-2-naphthol and the barium salt of 6-cyano-1 (1'-sulfo-2-naphthylazo)-2-naphthol, and the barium salt of 6-cyano-1(1'-sulfo-2-naphthylazo-2-naphthol).

Typical inorganic compositions include cadmium sulfide, cadmium sulfoselenide, zinc oxide, zinc sulfide, sulphur, selenium, mercuric sulfide, lead oxide, lead sulfide, cadmium selenide, titanium dioxide, indium trioxide and the like.

In addition to the aforementioned organic materials other organic materials which may be employed in the imaging layer include polyvinylcarbazole; N-isopropylcarbazole and 4,5-diphenylimidazolidinethione;

Other suitable electrically photosensitive materials are listed in copending application Ser. No. 708,380, referred to above.

The preferred electrically photosensitive materials are the phthalocyanines such as the beta-form metal free phthalocyanine, copper phthalocyanine, tetrachlorophthalocyanine, and the $x$ form of metal free phthalocyanine as described in U.S. Patent 3,357,989. The $x$-form phthalocyanine is preferred because of its excellent photosensitivity although any suitable phthalocyanine may be used to prepare the imaging layer of this invention. Reference is made to a book entitled. "Phthalocyanines Compounds" by F. H. Moser and A. L. Thomas published by the Reinhold Publishing Co., 1963 edition, for a detailed description of phthalocyanines and their syntheses. Other suitable phthalocyanines are listed in copending application Ser. No. 708,380 referred to above and is incorporated herein by reference.

The basic physical property desired in the imaging layer is that it be frangible as prepared or after having been suitably activated. That is, the layer must be sufficiently weak structurally so that the application of electrical field combined with the action of actinic radiation on the electrically photosensitive materials will fracture the imaging layer. Further, the layer must respond to the application of field the strength of which is below that field strength which will cause electrical breakdown or arcing across the imaging layer. Another term for "cohesively weak," therefore, would be "field fracturable."

The imaging layer serves as the photoresponsive element of the system as well as the colorant for the final image produced. Other colorants such as dyes and pigments may be added to the imaging layer so as to intensify or modify the color of the final images produced when color is important. Preferably, the imaging layer is selected so as to have a high level of response while at the same time being intensely colored so that a high contrast image can be formed by the high gamma system of this invention. The imaging layer may be homogeneous comprising, for example, a solid solution of two or more pigments. The imaging layer may also be heterogeneous comprising, for example, pigment particles dispersed in a binder.

One technique for achieving low cohesive strength in the imaging layer is to employ relatively weak, low molecular weight materials therein. Thus, for example, in a single component homogeneous imaging layer, a monomeric compound or a low molecular weight polymer complexed with a Lewis acid to impart a high level of photoresponse to the layer may be employed. Similarly, when a homogeneous layer utilizing two or more components in solid solution is selected to make up the imaging layer; either one or both of the components of the solid solution may be a low molecular weight material so that the layer has the desired low level of cohesive strength. This approach may also be taken in connection with the heterogeneous imaging layer. Although the binder material in the heterogeneous system may in itself be photosensitive it does not necessarily have this property. Materials may be selected for use as this binder material solely on the basis of physical properties without regard to their photosensitivity. This is also true of the two component homogeneous system where photoinsensitive materials with the desired physical properties can be used. Any other technique for achieving low cohesive strength in the imaging layer may also be employed. For example, suitable blends of incompatible materials such as a blend of a polysiloxane resin with a polyacrylic ester resin may be used either as the binder layer in a heterogeneous system or in conjunction with a "homogeneous" system in which the photoresponsive material may be either one of the incompatible components (complexed with a Lewis acid) or a separate and additional component of the layer. The thickness of the imaging layer whether homogeneous or heterogeneous ranges from about 0.2 micron to about 25 microns generally about 1 micron to about 10 microns and preferably about 5 microns.

The ratio of photosensitive pigment to binder by weight in the heterogeneous system may range from about 10 to 1 to about 1 to 10 respectively, but it has generally been found that properties in the range of from about 1 to 4 to about 2 to 1 respectively produce the best results and, accordingly, this constitutes a preferred range.

The binder material in the heterogeneous imaging layer or the material used in conjunction with the pigment materials in the homogeneous layer, where applicable, may comprise any suitable cohesively weak insulating material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parowax, available from Standard Oil of Ohio; waxes made from hydrogenated oils such as: Capitol City 1380 wax, available from Capitol City Products Co., Columbus Ohio; Caster Wax L–2790, available from Baker Caster Oil Co.; Vitikote L–304, available from Duro Commodities; polyethylenes such as: Eastman Epolene N–11, Eastman Epolene C–12, available from Eastman Chemical Products Co.; Polyethylene DYJT, Polyethylene DYLT, Polyethylene DYDT, all available from Union Carbide Corp.; Marlex TR 822, Marlex 1478, available from Phillips Petroleum Co.; Epolene C–13, Epolene C–10, available from Eastman Chemical Products Co.; Polyethylene AC8, Polyethylene AC612, Polyethylene AC324, available from Allied Chemical Co.; modified styrenes such as: Piccotex 75, Piccotex 100, Piccotex 120, available from Pennsylvania Industrial Chemical Co.; vinylacetate-ethylene copolymers such as: Elvax Resin 210, Elvax Resin 310, Elvax Resin 420, available from E. I. du Pont de Nemours & Co., Inc.; Vistanex MH, Vistanex L–80, available from Enjay Chemical Co.; vinyl chloride-vinyl acetate copolymers such as: Vinylite VYLF, available from Union Carbide Corp.; styrene-vinyl toluene copolymers, polypropylenes; and mixtures thereof. The use of an insulating binder is preferred because it allows the use of a larger range of electrically photosensitive pigments.

A mixture of microcrystalline wax and polyethylene is preferred because it is cohesively weak and an insulator.

Where the imaging layer is not sufficiently cohesively weak to allow imagewise fracture, it is desirable to include an activation step in the process of this invention prior to image formation by separation of the manifold sandwich. The activation step may take many forms such as heating the imaging layer thus reducing its cohesive strength or applying a substance to the surface of the imaging layer or including a substance in the imaging layer which substance lowers the cohesive strength of the layer or aids in lowering the cohesive strength. The substance so employed is termed an "activator." Preferably, the activator should have a high resistivity so as to prevent electrical breakdown of the manifold sandwich. Accordingly, it will generally be found to be desirable to purify commercial grades of activators so as to remove impurities which might impart a higher level of conductivity. This may be accomplished by running the fluids through a clay column or by employing any other suitable purification technique. Generally speaking, the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer. The activator can be applied at any point in the process prior to separation of the manifold sandwich. It is to be understood, however, that the invention is not limited to the use of these relatively volatile activators. In fact, very high boiling point non-volatile activators including silicone oils such as dimethyl-polysiloxanes and very high boiling point long chain aliphatic hydrocarbon oils ordinarily used as transformer oils such as Wemco-C transformer oil, available from Westinghouse Electric Co., have also been successfully utilized in the imaging process. Although these less volatile activators do not dry off by evaporation, image fixing can be accomplished contacting the image with an absorbent sheet such as paper which absorbs the activator fluid. In short, any suitable volatile or non-volatile activator may be employed. Typical activators include Sohio Odorless Solvent 3440, an aliphatic (kerosene) hydrocarbon fraction, available from Standard Oil Co. of Ohio, carbon tetrachloride, petroleum ether, Freon 214 (tetrafluorotetrachloropropane), other halogenated hydrocarbons such as perchloroethylene, trichloromonofluoromethane, trichlorotrifluoroethane, ethers such as diethyl ether, diisopropyl ether, dioxane, tetrahydrofuran, ethyleneglycol monoethyl ether, aromatic and aliphatic hydrocarbons such as benzene, toluene, xylene, hexane, cyclohexane, gasoline, mineral spirits and white mineral oil, vegetable oils such as coconut oil, babussu oil, palm oil, olive oil, castor oil, peanut oil and neat's-foot oil, decane, dodecane, and mixtures thereof. Sohio Odorless Solvent 3440 is preferred because it is odorless, nontoxic and has a relatively high flash point.

Although the imaging layers may be prepared as self-supporting films, normally these layers are coated onto a sheet referred to above as the donor sheet or substrate. For convenience the combination of imaging layer and donor sheet is referred to as the donor. When employing a binder the pigment can be mixed in the binder material by conventional means for blending solids as by ball milling. After blending the ingredients of the imaging layer the desired amount is coated on a substrate. In a particularly preferred form of the invention an imaging layer comprising the electrically photosensitive pigment dispersed in a binder is coated onto a transparent, electrically insulating donor sheet.

The imaging layer may be supplied in any color desired either by taking advantage of the natural color of the photoresponsive or binder materials in the imaging layer of the manifold set or by the use of additional dyes and pigments therein whether photoresponsive or not and, of course, various combinations of these photoresponsive and non-photoresponsive colorants may be used in the imaging layer so as to produce the desired color.

The donor sheet and receiver sheet may comprise any suitable electrically insulating or electrically conducting material. Insulating materials are preferred since they allow the use of high strength polymeric materials. Typical insulating materials include polyethylene, polypropylene, polyethylene terephthalate, cellulose acetate, paper, plastic coated paper, such as polyethylene coated paper, vinyl chloride-vinylidene chloride copolymers and mixtures thereof. Mylar (a polyester formed by the condensation reaction between ethylene glycol and terephthalic acid available from E. I. du Pont de Nemours & Co., Inc.) is preferred because of its durability and excellent insulative properties. Not only does the use of this type of high strength polymer provide a strong substrate for the positive and negative images formed on the donor substrate and receiver sheet but, in addition, it provides an electrical barrier between the electrodes and the imaging layer which tends to inhibit electrical breakdown of the system while subjecting the manifold sandwich to an electrical field. The donor sheet and receiver sheet may each be selected from different materials. Thus a manifold sandwich can be prepared by employing an insulating donor sheet while a conductive material is employed as a receiver sheet.

As stated above, according to the process of this invention, the imaging layer is subjected to an electrical field. The electrical field can be applied in many ways. Generally, the sandwich is placed between electrodes having different electrical potential. Also, an electrical charge can be imposed upon one or both of the donor sheet and receiver sheet before or after forming the sandwich by any one of several known methods for inducing a static electrical charge into a material. Static charges can be imposed by contacting the sheet or substrate with an electrically charged electrode. Alternatively one or both sheets may be charged using corona discharge devices such as those described in U.S. Pat. 2,588,699 to Carlson, U.S. Pat. No. 2,777,957 to Walkup, U.S. Pat. No. 2,885,556 to Gundlach or by using conductive rollers as described in U.S. Pat. 2,980,834 to Tregay et al., or by frictional means as described in U.S. Pat. 2,297,691 to Carlson or other suitable apparatus.

Thus the electrical field can be provided by means known to the art for subjecting an area to an electrical field. The electrodes employed may comprise any suitable conductive material and may be flexible or rigid. Typical conductive materials include: metals such as aluminum, brass, steel, copper, nickel, zinc, etc., metallic coatings on plastic substrates, rubber rendered conductive by the inclusion of a suitable material therein, or paper rendered conductive by the inclusion of a suitable material therein or through conditioning in a humid atmosphere to insure the presence therein of sufficient water content to render the material conductive. Conductive rubber is preferred because of its flexibility. In the process of this invention wherein the imaging layer is exposed to activating electromagnetic radiation while positioned between electrodes one of the electrodes must be at least partially transparent. The transparent conductive electrode may be made of any suitable conductive transparent material and may be flexible or rigid. Typical conductive transparent materials include cellophane, conductively coated glass, such as tin or indium oxide coated glass, aluminum coated glass, or similar coatings on plastic substrates. NESA, a tin oxide coated glass available from Pittsburgh Plate Glass Co., is preferred because it is a good conductor and is highly transparent and is readily available. In the process of this invention wherein the donor and/or receiver is composed of conductive material each may also be employed as the electrodes by which the imaging layer is subjected to an electrical field. That is either when employed as an electrode one or both of the donor sheet and receiver sheet may serve a dual function in the process of this invention.

The strength of the electrical field applied across the manifold sandwich depends on the structure of the manifold sandwich and the materials used. For example, if highly insulating receiver and donor substrate materials are used, a much higher field may be applied then if relatively conductive donor and receiver sheets are used. The field strength required may, however, be easily determined. If too large a potential is applied, electrical breakdown of the manifold sandwich will occur allowing arcing between the electrodes. If too little potential is applied, the imaging layer will not fracture in imagewise configuration. By way of example, if a 3 mil Mylar receiver sheet and a 2 mil Mylar donor sheet are used, potentials as high as 20,000 volts may be applied between the electrodes. The preferred field strengths across the manifold sandwich are, however, in the range of from about 1,000 volts per mil to about 7,000 volts per mil of electrically insulating material. Since relatively high potentials are utilized, it is desirable to insert a resistor in the circuit to limit the flow of current. Resistors on the order of from about 1 megohm to about 20,000 megohms are conventionally used.

A visible light source, an ultraviolet light source or any other suitable source of electromagnetic radiation may be used to expose the imaging layer of this invention. The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye sensitization so as to either increase or narrow the spectral response of a material to a peak or to broaden it to make it more panchromatic in its response.

After the image is formed in accordance with the manifold imaging process, the image is transferred in accordance with the process of this invention by contacting the image with an image receiving medium and applying external pressure to the medium and to either the donor or receiver sheet bearing the image to be transferred. Many methods of applying external pressure will occur to those skilled in the art. For example, a flat press may be employed wherein two flat surfaces of a size at least equal to the area of the image receiving medium and the image to be transferred are pressed together with the image transfer set in between the plates. Also, the image receiving medium can be laid on a flat surface and the donor or receiver sheet bearing the image to be transferred is laid image side down on top of the image receiving medium. A hand roller is then rolled across the back of the donor or receiver layer with sufficient pressure to transfer the image. Preferably, a pair of pressure rollers are employed through which an image transfer set is passed. The amount of externally applied pressure required to transfer an image in accordance with this invention is in the range of from about 200 lbs. per lineal inch to about 1000 lbs. per lineal inch. Normally pressure in the range of from about 250 lbs. per lineal inch to about 500 lbs. per lineal inch are employed. Preferably, from about 250 lbs. per lineal inch to about 300 lbs. per lineal inch is employed. In flat plate operation pressures in the range of from 4800 lbs. per in.$^2$ to about 24,000 lbs. per in.$^2$ can be employed. Higher pressures can be employed depending upon the materials used in the image transfer set.

In order to facilitate transfer of the image, the image receiving medium is coated with an activator. Activators useful in the manifold imaging process which are described above, are also useful in facilitating the transfer of the image to the image receiving medium. In those instances wherein an extended period of time lapses between the preparation of the image and the transfer of the image to an image receiving medium, image transfer is facilitated by coating both the image and the image receiving medium with an activator.

DESCRIPTION OF THE DRAWINGS

The advantages of this invention will become apparent upon consideration of the detailed disclosure of the invention especially when taken in conjunction with the accompanying drawings wherein:

FIG. 1 is a side sectional view of a manifold sandwich for use in the process of this invention.

FIG. 2 is a side sectional view illustrating exposure and resulting effect upon the photosensitive imaging layer of FIG. 1.

FIGS. 3a and b represent one method of transferring the manifold image of FIG. 2 to the surface of an image receiving medium.

Referring now to FIG. 1 there is seen a supporting donor substrate or sheet 11 upon which is an electrically photosensitive imaging layer generally designated at 12. In this particular illustration, layer 12 comprises an electrically photosensitive material 13 dispersed in a binder matrix 14. Above the imaging layer 12 is placed a third or receiver sheet 16.

FIG. 2 illustrates the effect obtained when the imaging layer of FIG. 2 is selectively exposed to electromagnetic radiation to which it is sensitive represented by lines 29 while the influence of an electric field resulting from the potential source 30 which passes through resistor 30a and electrodes 25 and 27. Upon separation of receiver 26 from donor 21 imaging layer 32 fractures along the lines defined by the pattern of electromagnetic radiation thereby producing complementary images on each of the donor 21 and receiver 26.

FIGS. 3a and b represent an embodiment of the present invention.

In FIG. 3a an image receiving medium herein represented as sheet 41 is superimposed upon the manifold image 32 residing on the surface of image bearing medium 26 which can be either the donor or receiver of FIG. 2. Pressure is applied in a manner demonstrated by pressure roller 42. FIG. 3b represents the separation phase of the transfer process whereby the image receiving medium 41 is separated from layer 26 having image 32 adhering to its surface. Normally the entire imaging material transfers to the image receiving medium and in FIG. 3b image trace 45 is portrayed to indicate the source of imaging material 32 now residing on image bearing medium 41.

DESCRIPTION OF PREFERRED EMBODIMENTS

The following examples further specifically illustrate the present invention. The examples below are intended to illustrate various preferred embodiments of the improved imaging method and do not limit the scope of this invention. The parts and percentages are by weight unless otherwise indicated.

Examples I and II

A commercial, metal-free phthalocyanine is first purified by acetone extraction to remove organic impurities. Since this extraction step yields a less sensitive beta crystalline form, the desired alpha form is obtained by dissolving 100 grams of the beta form in 600 cc. of sulfuric acid, precipitating it by pouring the solution into 3,000 cc. of ice water and washing with water to neutralize The resulting purified alpha phthalocyanine is salt milled for 6 days and desalted by slurrying in distilled water, vacuum filtering, water washing and finally methanol washing until initial filtrate is clear to produce the x-form phthalocyanine. After vacuum drying to remove residual methanol, the x-form phthalocyanine thereby produced is used to prepare the imaging layer according to the following procedure: Two grams of Paraflint RG wax, a microcrystalline wax available from Moore and Munger Inc. having a melting point of about 214° F., and 0.5 gram of Sunoco 5825, a microcrystalline wax with a melting point of about 150° F. is blended with a tri-mixture of 1.25 grams of the above purified x-form metal-free phthalocyanine, 0.8 gram Watchung Red B, 1-(4'-methyl-5'-chloroazobenzene-2'-sulfonic acid)-2-hydroxy-3-naphthoic acid, C.I. No. 15865, commercially available from E. I. du Pont de Nemours & Co. and 1.25 grams Algol Yellow GC, 1,2,5,6-di (C,C''-diphenyl)-thiazole-anthraquinone, C.I. No. 67300, commercially available from General Dyestuffs in 60 cc. of reagent grade petroleum ether. This formulation is added in a 1 pint wide-mouth glass jar together with a ½ pint volume and ½ inch diameter porcelain balls. The jar lid is lined with a 5 mil Teflon coating to avoid contamination and the lid screwed on the jar which serves as a ball mill container. The jar is wrapped with a black vinyl electrical pressure sensitive tape, type No. 33, available from Minnesota Mining and Manufacturing Corp. to protect the mill jar from shock and to shield the mill jar contents from light. This formulation is then ball milled at a rate of about 90 r.p.m. for about 24 hours. Following the 24 hour milling an additional 20 cc. of the petroleum ether is added. The mill is then rotated another 15 minutes after the addition of the second increment of the ether. A uniform coating of the resulting paste is applied to the top side of a two mil thick Mylar film using a No. 10 wire-wound drawdown rod to produce a donor sheet. The coating is air dried at room temperature for about 5 minutes. The imaging coating is measured to be about 2.5 microns in thickness. The air dried donor sheet is then fastened, donor coating facing up, to the electrically conductive surface of a transparent NESA glass electrode. An activator comprising n-decane is spread uniformly over the imaging layer by means of a brush saturated with the activator. A sheet of 4 mil polyethylene coated paper, available from Cracker Hamilton Co. is placed over the imaging layer as a receiver. Conductive black paper serving as the opaque electrode in the system is laid over the receiver sheet. A potential of about 10,000 volts is applied through a 1250 megohm resistor across the transparent and opaque electrodes with the NESA glass made the positive pole and the black conductive paper the negative pole. About 5 seconds after the electric field power is turned on and the manifold set is exposed to a light image by projecting a negative image upward through the transparent NESA electrode. The exposure is about 0.05 foot-candle illumination from an incandescent lamp about 2800K for a duration of about 4 seconds, making a total incident energy of about 0.20 foot-candle-second. About 3 seconds after the light exposure step, the receiver sheet and the opaque electrode are peeled off manually while the full 10,000 volt potential is still applied. Following separation a copy of the original negative is observed on the Mylar donor substrate and a reversal or positive of the original negative is observed on the receiver sheet. Each of the manifold images is placed in contact with a 5 mil Mylar sheet and passed at about 1 inch per second between steel rolls about 3 inches in diameter and spring loaded with an inter-roll force of about 1600 pounds. The total force applied is about 800 pounds per linear inch. Each image is thereby pressure transferred to its respective Mylar sheet. A well fixed image is thus produced on the Mylar sheets having excellent smudge resistance and suitable for use as a projection transparency.

Examples III and IV

The procedure described in Examples I and II is repeated up to and including the separation of the receiver sheet from the donor substrate. The resulting image bearing substrates are contacted under pressure conditions similar to those in the above Examples I and II with a lithographic aluminum grained substrate and an imprint of the respective waxy images transferred thereto. The resulting aluminum lithographic plates satisfy the requirements of lithography.

Example V

A positive donor image is produced according to the process of Examples I and II. While still wet with activator the positive donor image is contacted with a sheet of polyethylene coated paper. A squeegee is passed over the polyethylene coated paper using hand pressure. The image transfer set is then heated to dry the imaging layer by evaporating the activator. After drying the polyethylene sheet is separated from the Mylar donor sheet whereupon all of the imaging layer from the donor sheet completely transfers to the polyethylene coated paper producing a positive image on the paper.

Although specific components and proportions have been stated in the above description of preferred embodiments of the invention, other typical materials as listed above if suitable may be used with similar results. In addition, other materials may be used to synergize, enhance or otherwise modify the properties of the imaging layer. For example, various dyes, spectral sensitizers, particles made up of two or more layers, blends of materials, complexes, and electrical sensitizers such as Lewis acids may be added to the several layers.

Other modifications and ramifications of the present invention will occur to those skilled in the art upon a reading of the present disclosure. These are intended to be included within the scope of this invention.

What is claimed is:

1. The method of transferring an image from an image bearing medium to an image receiving medium which comprises the steps of:
   (a) providing an electrically photosensitive imaging layer sandwiched between a donor sheet and a receiver sheet;
   (b) rendering said imaging layer structurally fracturable in response to the combined effects of an applied electric field and exposure to electromagnetic radiation to which it is sensitive by applying to said layer an activating amount of an activator, said activator being selected from the group consisting of solvents, partial solvents, swelling agents and softening agents for said layer;
   (c) applying an electrical field across said imaging layer;
   (d) exposing said imaging layer to an imagewise pattern of electromagnetic radiation to which said imaging layer is sensitive while said layer is under said field;
   (e) separating said receiver sheet from said donor sheet while the imaging layer is under said field whereby said imaging layer fractures in imagewise configuration with a positive image adhering to one of the donor and receiver sheets and a negative image adhering to the other said donor and receiver sheet;
   (f) contacting at least one of said images with an image receiving medium while said activator is present and transferring substantially all of said image to said receiving medium by external application of pressure to said sheet and said receiving medium upon separation of said receiving medium and said sheet.

2. The method of claim 1 further including the step of applying an activator to said image receiving medium prior to contacting said image said activator selected from the group consisting of solvents, partial solvents, swelling agents and softening agents for said layer.

3. The method of claim 1 wherein the activator is n-decane.

4. The method of claim 3 wherein the receiver sheet is a polyethylene coated paper.

5. The method of claim 1 wherein said imaging layer is rendered structurally fracturable in response to the combined effects of an applied electric field and exposure to light to which it is sensitive by applying heat to said layer.

6. The method of claim 1 wherein the pressure is applied by means of a pair of rollers.

7. The method of claim 1 wherein the electrical field is in the range of from about 1,000 volts per mil to about 7,000 volts per mil.

8. The method of claim 1 wherein said receiving medium comprises a thermoplastic material.

9. The method of claim 8 wherein the thermoplastic material is a polyethylene coated paper.

10. The method of claim 6 wherein the externally applied pressure is in the range of from about 200 pounds per lineal inch to about 1000 pounds per lineal inch.

11. The method of claim 1 wherein the externally applied pressure is by means of flat plates exerting a pressure in the range of from about 4,800 pounds to about 24,000 pounds per square inch.

12. The method of claim 1 wherein the electrically photosensitive imaging layer comprises an electrically photosensitive material dispersed in an insulating binder.

13. The method of claim 12 wherein the electrically photosensitive material is an organic electrically photosensitive material.

14. The method of claim 1 further including the step of applying an activator to said image receiving medium and said image prior to contacting said image to said receiving medium wherein said activator is selected from the group consisting of solvents, partial solvents, swelling agents and softening agents for said imaging layer.

15. The method of claim 14 wherein the external application of pressure is by means of at least one roller.

References Cited

UNITED STATES PATENTS

| | | | |
|---|---|---|---|
| 3,438,772 | 4/1969 | Gundlach | 96—1 |
| 3,446,616 | 5/1969 | Clark | 96—28 X |
| 3,512,968 | 5/1970 | Tulagin | 96—1 X |
| 3,488,191 | 1/1970 | O'Donnell | 96—83 X |
| 3,554,125 | 1/1971 | Van Dorn et al. | 96—1.3 X |

FOREIGN PATENTS

| | | | |
|---|---|---|---|
| 672,342 | 12/1950 | Great Britain | 96—36 |

GEORGE F. LESMES, Primary Examiner

R. E. MARTIN, JR., Assistant Examiner

U.S. Cl. X.R.

96—1 R, 1.3, 28